United States Patent [19]

Taniguchi et al.

[11] Patent Number: 5,075,540
[45] Date of Patent: Dec. 24, 1991

[54] OPTICAL ENCODER WITH OFFSET ADJUSTING MEANS

[75] Inventors: Mitsuyuki Taniguchi; Hirofumi Kikuchi, both of Oshino, Japan

[73] Assignee: Fanuc Ltd., Minamitsuru, Japan

[21] Appl. No.: 566,463

[22] PCT Filed: Jan. 23, 1990

[86] PCT No.: PCT/JP90/00074

§ 371 Date: Aug. 16, 1990

§ 102(e) Date: Aug. 16, 1990

[87] PCT Pub. No.: WO90/08942

PCT Pub. Date: Sep. 8, 1990

[30] Foreign Application Priority Data

Jan. 25, 1989 [JP] Japan .................................. 1-15934

[51] Int. Cl.[5] .......................................... H01J 40/14
[52] U.S. Cl. ........................ 250/214 C; 250/231.16; 330/259
[58] Field of Search .................... 250/231.16, 214 AG, 250/214 A, 214 C; 330/259, 257, 288; 307/311

[56] References Cited

U.S. PATENT DOCUMENTS

| | | | |
|---|---|---|---|
| 4,429,283 | 1/1984 | Wittlinger | 330/259 |
| 4,460,873 | 7/1984 | Hester | 330/259 |
| 4,555,673 | 11/1985 | Huijsing et al. | 330/257 |
| 4,575,685 | 3/1986 | Dobkin et al. | 330/257 |
| 4,639,684 | 1/1987 | Laude | 330/259 |
| 4,857,725 | 8/1989 | Goodnough et al. | 250/214 A |

Primary Examiner—David C. Nelms
Assistant Examiner—Michael Messinger
Attorney, Agent, or Firm—Staas & Halsey

[57] ABSTRACT

An optical encoder, having an offset adjustment function for causing light receiving element outputs to have the same direct current component level, and capable of greatly reducing an adverse affection by noise, to thereby generate an accurate position signal. A combined signal (i10), generated in a third electric current mirror circuit (T17-T19) for receiving output currents (ia11, ia12) from light receiving elements (A11, A12) through first and second electric current mirror circuits (T11-T13, T14-T16) and serving as a feedback signal (i10', i10'') for eliminating an offset between direct current components of the output currents of the light receiving elements, is superimposed through a variable resistor (VRa1) on these output currents. The light receiving element outputs, free from a direct current component offset and delivered through the first and second electric current mirror circuits, are converted into voltages by means of resistors (R11, R12) having the same resistance with each other, and are applied to a comparator (Ca1), whereby an accurate position signal (Pa1) is generated.

6 Claims, 2 Drawing Sheets

5,075,540

OPTICAL ENCODER WITH OFFSET ADJUSTING MEANS

TECHNICAL FIELD

The present invention relates to an optical encoder, which is excellent in noise-resistant property and is capable of generating an accurate position signal.

BACKGROUND ART

An optical encoder is conventionally known, which is arranged to generate an output signal indicative of the rotary position of a rotary shaft in accordance with an output signal of a light receiving element disposed in facing relation to a light emitting element through a slitted disk mounted on the rotary shaft.

A typical optical encoder comprises a first pair (phase A) of light receiving elements A31, A32 and a comparator Ca3 for phase A (FIG. 3) connected to these light receiving elements, and further comprises a second pair (phase B) of light receiving elements B31, B32 and an associated comparator Cb3 (not shown). (Illustrations of elements associated with phase B will be similarly omitted hereinbelow.) Positions of these four light receiving elements are so adjusted that the light receiving element pair of each phase generate output signals ia31, ia32 (ib31, ib32) having a phase difference of 180 degrees from each other, and the comparator of each phase generates a rectangular signal Pa3 (Pb3) whose on-time width and off-time width are the same with each other, the rectangular signals Pa3 and Pb3 having a phase difference of 90 degrees. However, if an offset OSa3 (OSb3) is produced between direct current component levels of the output signals respectively supplied from the light receiving elements of the both phases, the on time period of the rectangular signal of each phase differs from the off time period thereof, or the phase difference between the rectangular signals of the both phases is deviated from the 90 degrees. This makes it impossible to generate accurate position signals.

Conventionally, to obviate the above drawback, variable resistors VRa3 and VRb3, each having opposite ends connected between positive and negative input terminals of an associated one of the comparators, are provided, and the sliding position of a movable contact, connected to a power source Vr3, of each variable resistor is so varied as to eliminate the offset between the direct current components of the outputs from an associated one of the light receiving element pairs connected to the comparators. However, according to such offset adjustment, when the movable contact of the variable resistor is greatly moved away from its central position so as to eliminate a large offset, the load resistances of the light receiving elements differ from each other. In this case, if noise is applied to the optical encoder, noise applied to one of the light receiving elements is greatly different in magnitude from that applied to the other because of the load resistance difference between the light receiving elements. This makes it difficult to generate accurate rotary position signals. In other words, the conventional optical encoder is poor in its noise-resistant property, and accordingly, is unstable in rotary position detection.

DISCLOSURE OF THE INVENTION

The object of the present invention is to provide an optical encoder which has an offset adjusting function for causing outputs of light receiving elements have the same direct current component level, and is capable of greatly reducing an adverse affection of noise, to thereby generate an accurate position signal.

In order to achieve the foregoing object, an optical encoder of the present invention comprises a pair of light receiving elements, and an offset adjusting means for eliminating an offset between direct current component levels of outputs of the light receiving elements. The offset adjusting means is operable to generate first and second feedback signals for eliminating the offset on the basis of a combined output signal of the light receiving element pair, and cause these feedback signals to be superimposed on the respective outputs of the light receiving element pair.

As explained above, according to the present invention, since the offset adjusting means for eliminating the direct current component levels of the outputs from the light receiving element pair is provided, accurate rotary position signals can be generated on the basis of the output signals from the light receiving elements. In addition, since the offset is eliminated by superimposing the feedback signals, generated from the combined output signal from the light receiving elements, on the output signals of these light receiving elements, load resistors having the same resistance can be connected to the respective light receiving elements, whereby an adverse affection of noise applied to the optical encoder can be greatly reduced.

BEST MODE OF CARRYING OUT THE INVENTION

Figure 1:
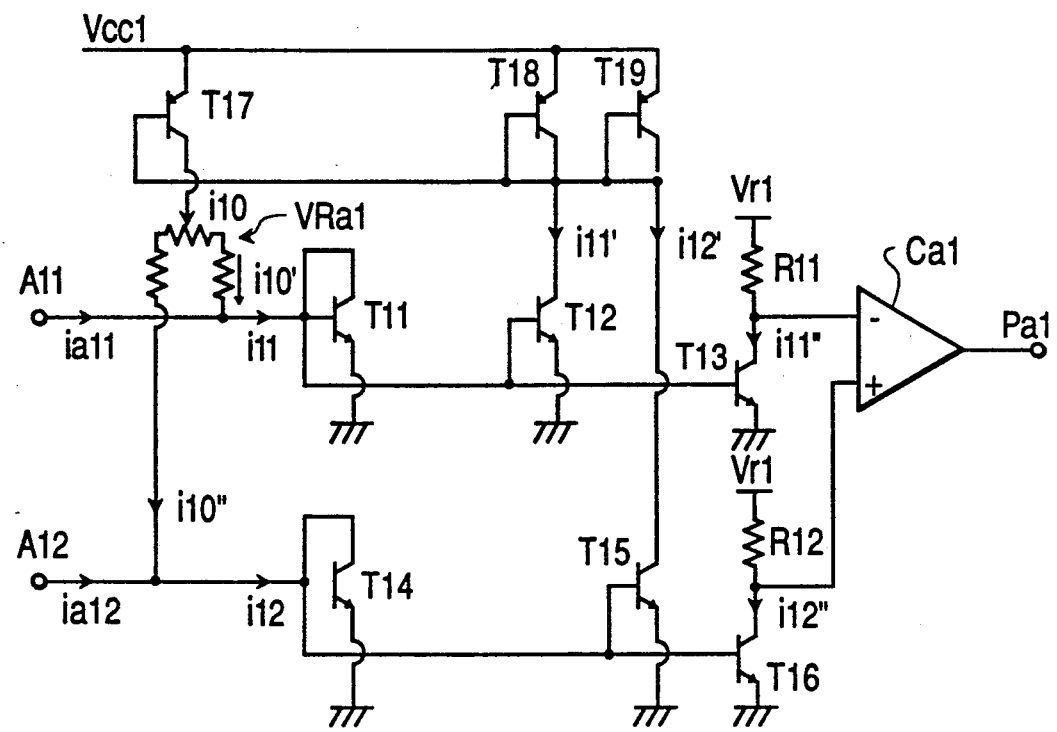
FIG. 1 is a schematic circuit diagram showing an essential part of an optical encoder according to a first embodiment of the present invention.

With reference to FIG. 1, an optical encoder according to a first embodiment of the present invention will be explained.

Figure 3:
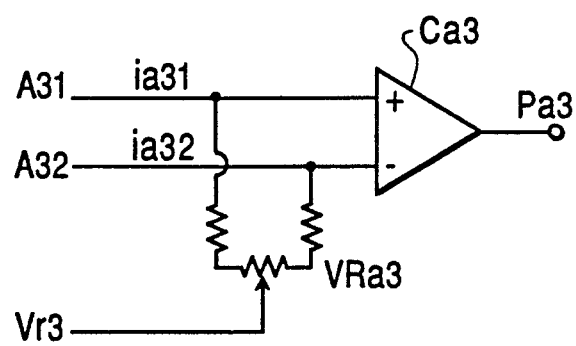
FIG. 3 is a circuit diagram showing part of a conventional optical encoder.
Figure 4:
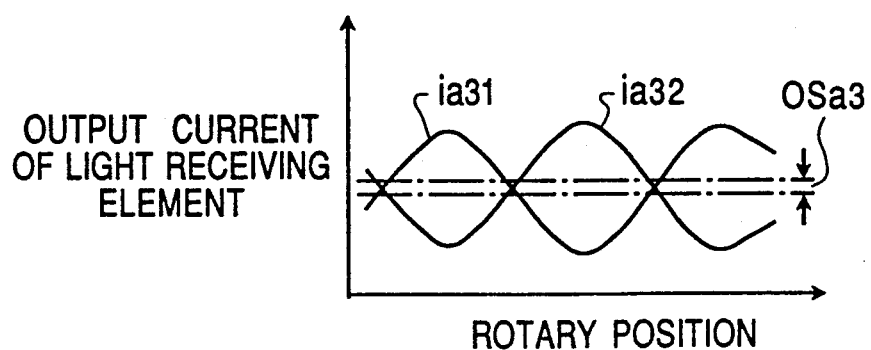
FIG. 4 is a waveform diagram showing an offset between output currents supplied from a pair of light receiving elements shown in FIG. 3.

The optical encoder, which is constructed fundamentally in the same manner as the optical encoder of FIG. 3, comprises first and second light receiving elements A11 and A12 which are arranged to generate output current signals ia11 and ia12, respectively, which are 180 degrees out of phase with each other. These light receiving elements are connected to a comparator Ca1 through an offset adjustment circuit which forms an essential part of the present invention. This offset adjustment circuit comprises first and second electric current mirror circuits which are respectively interposed between the light receiving elements A11, A12 and the comparator Ca1, and a third electric current mirror circuit for causing first and second feedback signals, which are respectively generated on the basis of a combined output signal of the light receiving elements, to be respectively superposed on the outputs of the light receiving elements.

More specifically, the first electric current mirror circuit, which includes three transistors T11 to T13, is arranged to provide feedback from the output side of the transistor T11 to the input side thereof, the transistor T11 being connected to the first light receiving element A11 and having the collector thereof connected to the base of the same transistor. The base of the transistor T11 is connected to the bases of the transistors T12 and T13, and the emitters of the transistors T11 to T13 are grounded. Similarly, in the second electric current mirror circuit which includes transistors T14 to T16, the base of the transistor T14 which is connected to the second light receiving element A12 is connected to the collector of the transistor T14 and to the bases of the transistors T15 and T16, and the emitters of the transistors T14 to T16 are grounded. Further, the collectors of the transistors T13 and T16 of the first and second electric current mirror circuits are respectively connected to the negative and positive input terminals of the comparator Ca1, and are respectively connected to a voltage source Vr1 through resistors R11 and R12. To be noted, the resistors R11 and R12 have the same resistance to thereby reduce and adverse affection of in-phase noise.

The third electric current mirror circuit, which is adapted to receive the combined output from the first and second light receiving elements A11 and A12, includes transistors T17 to T19 whose bases are respectively connected to the collectors of the transistors T12 and T15, and the emitters of the three transistors are connected to a voltage source Vcc1. The collector of the transistor T17 is connected to the movable contact of a variable resistor VRa1 having both ends thereof respectively connected to the bases of the transistors T11 and T14, and the base of the transistor T17 is connected to the base and collector of the transistors T18 and T19.

The first to third electric current mirror circuits are so arranged that the following equations (1) to (3) are fulfilled at least approximately.

$$i11 = i11' = i11'' \quad (1)$$

$$i12 = i12' = i12'' \quad (2)$$

$$i10 = (i11' = i12')/2 \quad (3)$$

wherein symbol i11 denotes a base electric current of the transistor T11; i11' and i11'', collector currents of the transistors T12 and T13; i12, a base current of the transistor T14; i12' and i12'', collector currents of the transistors T15 and T16; i10, i11' and i12', collector currents of the transistors T17 to T19, respectively.

If the direct current components of the outputs ia11, ia12 of the first and second light receiving elements A11 and A12 are represented by Ia11 and Ia12, and if the amplitude of the alternating current components thereof is represented by I10, the output currents ia11, ia12 are represented by the following equations (4) and ((5), respectively.

$$ia11 = Ia11 + I10 \cdot \sin \theta \quad (4)$$

$$ia12 = Ia12 + I10 \cdot \sin(\theta - \pi) = Ia12 - I10 \cdot \sin \theta \quad (5)$$

Further, if the currents supplied from the transistor T17 of the third electric current mirror circuit and superimposed through the variable resistor VRa1 on the output currents of the first and second light receiving elements are respectively represented by i10' and i10'', the base currents i11 and i12 of the transistors T11 and T14 are represented by the following equations (6) and (7), respectively.

$$i11 = ia11 + i10' = Ia11 + I10 \cdot \sin \theta + i10' \quad (6)$$

$$i12 = ia12 + i10'' = Ia12 - I10 \cdot \sin \theta + i10'' \quad (7)$$

The sum of the superimposed currents i10' and i10'' is equal to the collector current (electric current for offset adjustment) i10, and accordingly the following equation (8) is fulfilled.

$$i10 = i10' + i10'' \quad (8)$$

We obtain the following equation (9) from the aforesaid equations (1) through (3).

$$i10 = (i11' + i12')/2 = (i11 + i12)/2 \quad (9)$$

By substituting equations (6) through (8) for equation (9), we obtain the following equation (10).

$$i10 = Ia11 + Ia12 \quad (10)$$

Namely, the collector current i10 does not contain an alternating current component, and accordingly, the aforesaid superimposed currents i10' and i10'' also do not contain an alternating current component.

If an adjustment is made by means of the variable resistor VRa1 in such a manner that the direct current component of the base current i11 coincides with that of the base current i12, the following equation (11) is fulfilled.

$$Ia11 + i10' = Ia12 + i10'' \quad (12)$$

We obtain the following equations (13) and (14) from equations (8), (10) and (12) and from equation (8), (10) and (13), respectively.

$$i10' = Ia12 \quad (13)$$

$$i10'' = Ia11 \quad (14)$$

By substituting equation (13) for equation (6) and substituting equation (14) for equation (7), we obtain the following equations (15) and (16).

$$i11 = Ia11 + Ia12 + I0 \cdot \sin \theta \quad (15)$$

$$i12 = Ia11 + Ia12 - I0 \cdot \sin \theta \quad (16)$$

Namely, the direct current component of each of the base currents i11 and i12 is equal to the sum of the direct current components of the output current signals of the first and second light receiving elements. Accordingly, even when the light receiving element outputs are varied due to a variation in an amount of light projected from the light emitting elements to the light receiving elements, for instance, an offset never be produced between the direct current components of these base currents.

We obtain the following equations (17) and (18) from equations (1) and (15) and from equations (2) and (16), respectively.

$$i11'' = Ia11 + Ia12 + I0 \cdot \sin \theta \quad (17)$$

$$i12'' = Ia11 + Ia12 - I0 \cdot \sin \theta \quad (18)$$

Consequently, no offset is produced between the direct current component of the collector current i11″ flowing through the transistor T13 connected to the negative input terminal of the comparator Ca1 and the direct current component of the collector current i12 flowing through the transistor T16 connected to the positive input terminal of the comparator Ca1. Therefore, there is no offset between the direct current components of the positive and negative input voltages which are respectively applied to the positive and negative input terminals of the comparator Ca1 through the resistors R11 and R12. As a result, the comparator Ca1 is enabled to generate a rectangular signal Pa1 indicative of an accurate rotary position. In addition, since the resistors R11 and R12 have the same resistance, no substantial adverse affection is found even when noise is applied to the optical encoder.

Figure 2:
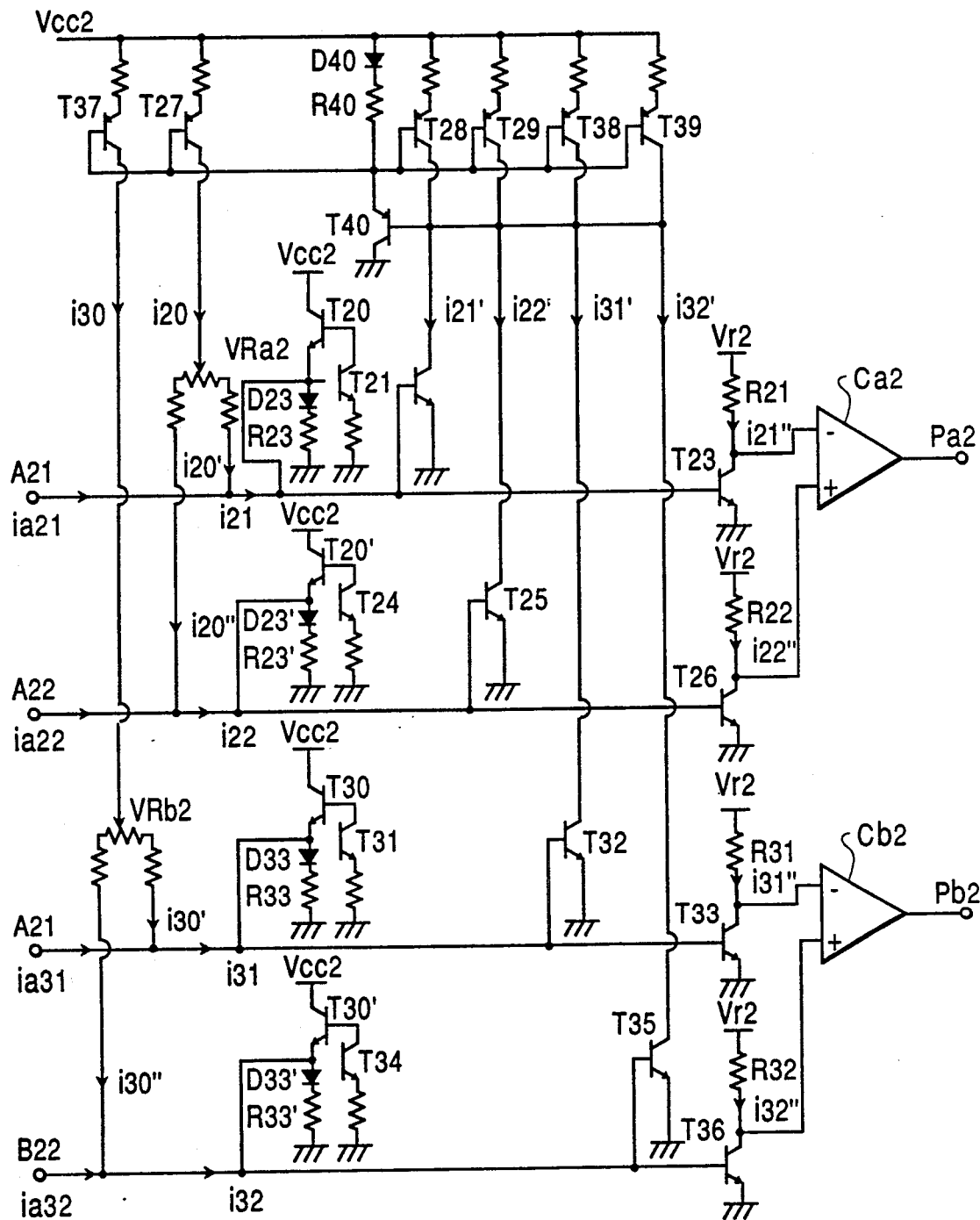
FIG. 2 is a view, similar to FIG. 1, showing an optical encoder according to a second embodiment of the present invention.

With reference to FIG. 2, an optical encoder according to a second embodiment of the present invention will be explained.

The optical encoder of FIG. 2 is constructed in basically the same manner as that of FIG. 1, except in that the optical encoder of FIG. 2 comprises third and fourth light receiving elements B21 and B22 for phase B and a second comparator Cb2 for phase B, in addition to first and second light receiving elements A21 and A22 for phase A and a first comparator Ca2 for phase A, which respectively correspond to the light receiving elements A11, A12 and the comparator Ca1 of FIG. 1, whereby rectangular output Pa2 and Pb2, which are 90 degrees out of phase with each other, are generated from these comparators.

In FIG. 2, symbols Vcc2 and Vr2 respectively denote voltage sources corresponding to the elements Vcc1 and Vr1 of FIG. 1; R21 and R22, resistors respectively corresponding to the elements R11 and R12 of FIG. 1; and R31 and R32, similar resistors for phase B. These four resistors have the same resistance. Further, symbol VRa2 denotes a variable resistor which corresponds to the element VRa1 of FIG. 1, and symbol VRb2 denotes a similar variable resistor for phase B.

Furthermore, the optical encoder of FIG. 2 comprises fourth and fifth electric current mirror circuits for phase B, in addition to first through third electric current mirror circuits which respectively correspond to the first through third electric current mirror circuits of FIG. 1. More specifically, the first and second electric current mirror circuits respectively include transistors T21 to T23 and T24 to T26 which respectively correspond to the transistors T11 to T13 and T14 to T16 of FIG. 1. The fourth and fifth electric current mirror circuits respectively include similar transistors T31 to T33 and T34 to T36 for phase B. The third electric current mirror circuit includes transistors T37 to T39 serving as a feedback current supply section for phase B, in addition to transistors T27 to T29 which respectively correspond to the transistor T17 to T19 of FIG. 1. The aforesaid transistors are connected with one another and with the peripheral elements in substantially the same manner as in FIG. 1, and therefore, a detailed explanation thereof will be omitted.

The first to fifth electric current mirror circuits are provided with first to fifth base current compensation circuits, respectively. Namely, the first base current compensation circuit, which includes a transistor T20 whose collector is connected to the voltage source Vcc2, the base and emitter of the same transistor being connected to the collector and base of the transistor T21, is so arranged as to feedback an output of the transistor T21 to an input of the transistor T21 through the transistor T20. Further, the first base current compensation circuit includes a diode D23 whose anode is connected to a node between the emitter of the transistor T20 and the base of the transistor T21, and a resistor R23, which has one end thereof connected to the cathode of the just-mentioned diode and another end thereof grounded.

The second, fourth and fifth base current compensation circuits respectively include corresponding ones of transistors T20′, T30 and T30′, diodes D23′, D33 and D33′, and resistors R23′, R33 and R33′, which correspond to the aforesaid elements T20, D23 and R23, respectively. The third base current compensation circuit includes a transistor T40 whose base is connected to the collectors of the transistors T22, T25, T32 and T35, and the collector of which is grounded, a resistor R40 having one end thereof connected to a node between the emitter of the transistor T40 and the bases of the transistors T27–T29 and T37–T39, and a diode D40 whose cathode and anode are connected to another end of the resistor R40 and the voltage source Vcc2, respectively.

In the first through fifth electric current mirror circuits, the following equations (19) to (23) are at least approximately fulfilled.

$$i21 = i21' = i21'' \tag{19}$$

$$i22 = i22' = i22'' \tag{20}$$

$$i31 = i31' = i31'' \tag{21}$$

$$i32 = i32' = i32'' \tag{22}$$

$$i20 = i30 = (i21' + i22' + i31' + i32')/4 = (i21 + i22 + i31 + i32)/4 \tag{23}$$

wherein symbols i21, i22, i31 and i32 respectively denote the base currents of the transistors T21, T24, T31 and T34; i21′, i21″, i22′ and i22″, the collector currents of the transistors T22, T23, T25 and T26, respectively; and i31′, i31″, i32′ and i32″, the collector currents of the transistors T32, T33, T35 and T36, respectively. Further, symbols i20 and i30 respectively denote the collector currents of the transistors T27 and T37.

If the direct current components of the output currents ia21, ia22, ib21 and ib22 of the first to the fourth light receiving elements A21 to B22 are respectively represented by Ia21, Ia22, Ib21 and Ib22, and if the amplitude of their alternating current components is represented by I20, these output currents are represented by the following equations (24) to (27), respectively.

$$i21 = Ia21 + I20 \cdot \sin \theta \tag{24}$$

$$ia22 = Ia22 - I20 \cdot \sin \theta \tag{25}$$

$$ia31 = Ia31 + I20 \cdot \cos \theta \tag{26}$$

$$ia32 = Ia32 - I20 \cdot \cos \theta \tag{27}$$

Further, if the currents supplied from the transistor T27 of the third electric current mirror circuit and superimposed through the variable resistor VRa2 on the output currents of the first and second light receiving elements are respectively represented by i20′ and i20″, and if the currents supplied from the transistor T37 and superimposed through the variable resistor VRb2 on the output currents of the third and fourth light receiving elements are respectively represented by i30′ and i30″, the base currents i21, i22, i31 and i32 of the transistors T21, T24, T31 and T34 are represented by the following equations (28) and (31), respectively.

$$i21 = ia21 + i20' = Ia21 + I20 \cdot \sin\theta + i20' \quad (28)$$

$$i22 = ia22 + i20'' = Ia22 - I20 \cdot \sin\theta + i20'' \quad (29)$$

$$i31 = ia31 + i30' = Ia31 + I20 \cdot \cos\theta + i30' \quad (30)$$

$$i32 = ia32 + i30'' = Ia32 - I20 \cdot \cos\theta + i30'' \quad (31)$$

The sum of the superimposed currents i20′ and i20″ for phase A is equal to the collector current i20, and the sum of the superimposed currents i30′ and i30″ for phase B is equal to the corrector current i30, and accordingly the following equations (32) and (33) are fulfilled.

$$i20 = i20' + i20'' \quad (32)$$

$$i30 = i30' + i30'' \quad (33)$$

By substituting equations (28) through (33) for equation (23), we obtain the following equation (34).

$$i20 = i30 = (Ia21 + Ia22 + Ia31 + Ia32)/2 \quad (34)$$

Namely, each of the collector currents i20 and i30 does not contain an alternating current component.

If an adjustment is made by means of the variable resistor VRa2 in such a manner that the direct current component of the base current i21 coincides with that of the base current i22, and a similar adjustment is made by using the variable resistor VRb2 so that the base currents i31 and i32 have the same direct current components, the following equations (35) and (36) are fulfilled (see, equations (32) and (33)).

$$Ia21 + i20' = Ia22 + i20'' = Ia22 - i20 - i20' \quad (35)$$

$$ia31 + i30' = Ia32 + i30'' = Ia32 - i30 - i30' \quad (36)$$

By substituting equation (34) for equations (35) and (36), we obtain the following equations (37) to (40).

$$i20' = (3Ia22 - Ia21 + Ia31 + Ia32)/4 \quad (37)$$

$$i20'' = (3Ia21 - Ia22 + Ia31 + Ia32)/4 \quad (38)$$

$$i30' = (3Ia32 - Ia31 + Ia21 + Ia22)/4 \quad (39)$$

$$i30'' = (3Ia31 - Ia32 + Ia21 + Ia22)/4 \quad (40)$$

Namely, the direct current components Ia21+i20′, Ia22+i20″, Ia31+i30′ and Ia32+i30″ of the base currents i21, i22, i31 and i32 are respectively represented by the following equations (41) and (42).

$$Ia21 + i20' = Ia22 + i20'' = \{3(Ia21 + Ia22) + Ia31 + Ia32\}/4 \quad (41)$$

$$Ia31 + i30' = Ia32 + i30'' = \{3(Ia31 + Ia32) + Ia21 + Ia22\}/4 \quad (42)$$

That is, the respective direct current components of the base currents i21, i22, i31 and i32 are represented as a function of the sum of the direct current components of the output currents of the first and second light receiving elements and the sum of the direct current components of the output currents of the third and fourth light receiving elements. Therefore, even when amounts of light projected from the light emitting elements are varied, for instance, an offset never be produced between the direct current components of the input signals applied to the first and second electric current mirror circuits and between the direct current components of the input signals applied to the third and fourth electric current mirror circuits.

Consequently, rectangular signals Pa2 and Pb2 indicative of accurate rotary positions are generated by the comparators Ca2 and Cb2 for phases A and B for the same reason explained for the first embodiment with reference to equations (17) and (18). Also, the optical encoder is highly noise-resistant.

The present invention is not limited to the first and second embodiments given above, and may be modified in various ways.

For example, although each of the electric current mirror circuits in the both embodiments is comprised of three transistors, the number of transistors never be limited thereto. Meanwhile, the offset adjustment current (i10, etc.) varies in dependence on the number of transistors contained in the electric current mirror circuit, so that a suitable electric current value can be attained.

We claim:

1. An optical encoder, comprising:
   a pair of light receiving elements; and
   an offset adjusting means for eliminating an offset between direct current component levels of output signals of the light receiving elements;
   wherein said offset adjusting means is operable to generate first and second feedback signals for eliminating the offset on the basis of a combined output signal of said light receiving element pair, and cause these feedback signals to be superimposed on the respective output signals of said light receiving element pair.

2. An optical encoder according to claim 1, wherein said offset adjusting means includes first and second electric current mirror circuits for receiving output signals respectively supplied from said light receiving element pair, and a third electric current mirror circuit for combining the output signals received from said light receiving element pair through said first and second electric current mirror circuits.

3. An optical encoder according to claim 2, wherein each of said electric current mirror circuits is arranged to provide feedback of an output from said each electric current mirror circuit to an input side of the same electric current mirror circuit.

4. An optical encoder according to claim 2, wherein said offset adjusting means includes a variable resistor for distributing the combined output signal of said light receiving element pair, combined by said third electric current mirror circuit.

5. An optical encoder according to claim 1, further comprising:
   a comparator for receiving the output signals from said light receiving element pair through said offset adjusting means and for comparing the thus received output signals with each other.

6. An optical encoder according to claim 5, wherein said comparator has a pair of input terminals for receiving the output signals from said light receiving elements, respectively, and said input terminals are respectively connected to load resistors which have the same resistance with each other.

* * * * *